United States Patent
Tener et al.

(10) Patent No.: US 7,103,235 B2
(45) Date of Patent: Sep. 5, 2006

(54) EXTENDED RANGE IMAGE PROCESSING FOR ELECTRO-OPTICAL SYSTEMS

(75) Inventors: Gene D. Tener, Oviedo, FL (US); Richard W. Benton, Sr., Altamonte Springs, FL (US); Timothy Alderson, Winter Spring, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 632 days.

(21) Appl. No.: 09/841,079

(22) Filed: Apr. 25, 2001

(65) Prior Publication Data
US 2002/0159651 A1 Oct. 31, 2002

(51) Int. Cl.
*G06K 9/32* (2006.01)

(52) U.S. Cl. ............... 382/294; 382/284; 382/300; 382/266

(58) Field of Classification Search ......... 382/254, 382/255, 266, 269, 275, 298–300, 284, 294
See application file for complete search history.

(56) References Cited

U.S. PATENT DOCUMENTS

| | | | |
|---|---|---|---|
| 5,341,442 A | 8/1994 | Barrett | |
| 5,382,977 A | 1/1995 | Kozlowski et al. | |
| 5,391,873 A | 2/1995 | Cuthbertson | |
| 5,446,378 A | 8/1995 | Reich et al. | |
| 5,455,622 A | 10/1995 | Compton | |
| 5,528,290 A * | 6/1996 | Saund ............ | 348/218.1 |
| 5,563,405 A | 10/1996 | Woolaway, II et al. | |
| 5,589,928 A | 12/1996 | Babbitt et al. | |
| 5,629,988 A | 5/1997 | Burt et al. | |
| 5,631,466 A | 5/1997 | Botti et al. | |
| 5,648,649 A | 7/1997 | Bridgelall et al. | |
| 5,657,402 A * | 8/1997 | Bender et al. ....... | 382/284 |
| 5,693,940 A | 12/1997 | Botti et al. | |
| 5,717,208 A | 2/1998 | Woolaway, II | |
| 5,721,427 A | 2/1998 | White et al. | |
| 5,801,678 A | 9/1998 | Huang et al. | |
| 5,872,628 A | 2/1999 | Erskine | |
| 5,903,659 A | 5/1999 | Kilgore | |

(Continued)

FOREIGN PATENT DOCUMENTS

EP 0 653 882 A1 5/1995

(Continued)

OTHER PUBLICATIONS

Erik Meijering, "TransformJ: A Java Package for Geometrical Image Transformation", "TransformJ: Affine" p. 2 of 3.*

*Primary Examiner*—Andrew W. Johns
*Assistant Examiner*—Patrick L Edwards
(74) *Attorney, Agent, or Firm*—Buchanan Ingersoll & Rooney PC (57) ABSTRACT

A method and apparatus for processing imagery using images acquired via any known Electro-Optical (EO) system. In accordance with exemplary embodiments of the present invention, a first frame of data is selected as a template frame (e.g., a given frame). A second frame of data can be captured using the EO system. At least a portion of the second frame can be correlated with the template frame to generate a shift vector. The second frame can then be registered with the template frame by interpolating the second frame using the shift vector and re-sampling at least a portion of the second frame to produce a registered frame. The template frame can also be re-sampled. The registered frame and the re-sampled template frame can then be combined to generate an averaged frame. The averaged frame can be spatially filtered to enhance edges within the averaged frame.

20 Claims, 5 Drawing Sheets

U.S. PATENT DOCUMENTS

| | | | |
|---|---|---|---|
| 5,925,875 A | 7/1999 | Frey | |
| 5,925,880 A | 7/1999 | Young et al. | |
| 5,925,883 A | 7/1999 | Woolaway, II | |
| 5,949,919 A | 9/1999 | Chen | |
| 5,963,675 A * | 10/1999 | van der Wal et al. | 382/260 |
| 6,011,625 A * | 1/2000 | Glass | 356/496 |
| 6,018,162 A | 1/2000 | Herbst et al. | |
| 6,020,842 A | 2/2000 | Lewis et al. | |
| 6,040,568 A | 3/2000 | Caulfield et al. | |
| 6,040,570 A | 3/2000 | Levine et al. | |
| 6,046,695 A * | 4/2000 | Poehler et al. | 342/25 |
| 6,047,028 A * | 4/2000 | Van Ackere et al. | 375/240.12 |
| 6,185,315 B1 * | 2/2001 | Schmucker et al. | 382/108 |
| 6,198,768 B1 | 3/2001 | Yamaguchi et al. | |
| 6,205,259 B1 * | 3/2001 | Komiya et al. | 382/284 |
| 6,208,765 B1 * | 3/2001 | Bergen | 382/268 |
| 6,269,175 B1 * | 7/2001 | Hanna et al. | 382/107 |
| 6,269,195 B1 | 7/2001 | Gonsalves et al. | |
| 6,336,082 B1 * | 1/2002 | Nguyen et al. | 702/179 |
| 6,359,681 B1 | 3/2002 | Housand et al. | |
| 6,438,275 B1 * | 8/2002 | Martins et al. | 382/300 |
| 6,477,279 B1 | 11/2002 | Go | |
| 6,556,704 B1 * | 4/2003 | Chen | 382/154 |
| 6,630,674 B1 | 10/2003 | Knauth et al. | |
| 6,654,504 B1 | 11/2003 | Lubin et al. | |
| 2002/0159101 A1 | 10/2002 | Alderson et al. | |
| 2002/0159648 A1 | 10/2002 | Alderson et al. | |

FOREIGN PATENT DOCUMENTS

| | | |
|---|---|---|
| EP | 0 830 013 A2 | 3/1998 |
| WO | WO 97/01926 | 1/1997 |

\* cited by examiner

EXTENDED RANGE IMAGE PROCESSING FOR ELECTRO-OPTICAL SYSTEMS

CROSS REFERENCE TO RELATED APPLICATION

The present application is related to U.S. patent application entitled "Scene-Based Non-Uniformity Correction for Detector Arrays", Ser. No. 09/840,920, and to U.S. patent application entitled "Dynamic Range Compression", Ser. No. 09/841,081, both filed even date herewith.

BACKGROUND

1. Field of the Invention

The present invention relates to image processing. More particularly, the present invention relates to processing image data using images acquired via Electro-Optical (EO) systems.

2. Background Information

EO systems are often used for "remote sensing." The term "remote sensing" generally refers to the acquisition and measurement of data/information related to one or more properties of a phenomenon, object, or material by a recording device not in physical contact with the object under surveillance. Imaging techniques often involve gathering information by measuring electromagnetic fields, electromagnetic radiation, or acoustic energy using cameras, radiometers, scanners, lasers, radio frequency receivers, radar systems, sonar, thermal devices, seismographs, magnetometers, gravimeters, scintillometers, and like instruments. For example, such data can be acquired and interpreted to remotely sense information about features associated with a target.

Intelligence gathering, particularly within strategic, tactical, or otherwise hostile military environments, often relies on technology generally referred to as Enhanced Vision (EV) systems. Through the use of imaging sensors, such as Charge-Coupled Device (CCD) cameras, Forward-Looking Infrared (FLIR), vidicon cameras, Low Light Level cameras, laser illuminated cameras, and the like, targets can be acquired and imagery can be processed and viewed at significantly longer ranges than otherwise possible in an operational scenario.

With reference to, for example, FLIR systems, remote sensing can refer to the detecting and measuring of electromagnetic energy, usually thermal or photonic, emanating from distant objects made of various materials. Using FLIR imaging, objects can be identified and categorized by, for example, class, type, substance, or spatial distribution.

To facilitate the acquisition and processing of information from EO systems, sensors can be used on a system's front end to generate raw data for processing. Such sensors can be radar imaging sensors, infrared imaging sensors, electro-optic sensors and the like. In each case, information from which image features can be derived can be used to generate image frames which can then be input to, for example, a display system. Image frames can be integrated with other operational features to form a stable display and to allow for such functions as target identification, acquisition, and tracking to be performed. Ideally, such systems can be linked to weapons systems to provide guidance input and ordnance control.

In conventional EO systems, the sensors used are limited in their resolution by the fixed spacing between sensor elements. Because of the Nyquist frequency of the sensor as determined by element spacing, image artifacts such as aliasing can be evident in the displayed imagery. A similar type of distortion can arise in, for example, a scene containing edge transitions which are so close together that a sensor cannot accurately resolve them. Resultant distortion can manifest itself as color fringes, in a color camera, around an edge or the like, reducing the ability of a viewer to perceive, for example, letters or object outlines with clarity. Range performance of an EO sensor is also often limited by the Nyquist frequency of the sensor, particularly those containing staring focal-plane arrays. In addition, sensor range can be limited by distortion levels or noise associated with sensor construction.

A conventional method of improving the range performance of an EO system is to improve upon the optics of the system. Such improvements include increasing the focal length of the optics and improving the F/number, i.e., the ratio between the focal length and the aperture size (diameter of a lens), of the system. These types of improvements, however, increase the cost and size of the system, which can lead to a design that is too costly or too large to fit the application.

One technique for addressing the range performance and Nyquist frequency limitations of an EO system is to dither the system, such that the system will sample once, then move the sensor over some sub-pixel amount, and then sample again. Such a technique gives the EO system the appearance that the image is sampled twice as often, and, therefore, the Nyquist frequency of the sensor has effectively doubled. This is often implemented using a dither mechanism such as a Fast Scan Mirror (FSM). However, dither mechanisms, such as a FSM, are usually very expensive and are sensitive to vibrations and alignment.

To address noise in EO systems, U.S. Pat. No. 5,925,875 (Frey) discloses a method and apparatus for compensating fixed pattern noise in planar arrays using a dithering mechanism to dither an observed image relative to the array.

It would be desirable to improve the range performance of EO systems while preserving the integrity of existing EO systems.

SUMMARY OF THE INVENTION

A method and apparatus is described for processing imagery using images acquired via any known Electro-Optical (EO) system. In accordance with exemplary embodiments of the present invention, a first frame of data is selected as a template frame (e.g., a given frame). The first frame can be captured using the EO system, and becomes the template frame to which subsequent frames are compared. A second frame of data can be captured with the EO system, and at least a portion of the second frame can be correlated with the template frame to generate a shift vector that contains a magnitude and direction that the second frame has shifted relative to the template frame. The second frame can then be spatially registered with the template frame by interpolating the second frame using the shift vector. The second frame can be re-sampled (e.g., oversampled) using interpolation techniques to produce a registered frame. The registered frame and a likewise re-sampled template frame (which can be derived from the template frame alone or from any number of earlier processed frames) can then be combined to generate an averaged frame with an improved signal-to-noise ratio (SNR). The averaged frame can be spatially filtered to enhance edges within the averaged frame.

In accordance with alternate exemplary embodiments, input data from the EO system can be generated by adding motion to the line of sight of the EO system using a known or random pattern to generate multiple frames of data to over-sample the scene. For example, dither patterns, such as rolling patterns or box patterns involving a predetermined number of pixels, can be established by controlling the EO system's Line-Of-Sight (LOS).

In accordance with alternate exemplary embodiments, the template frame can be interpolated using, for example, bilinear interpolation to provide a re-sampled frame. The re-sampled frame can then be temporally filtered to generate an image with improved SNR.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
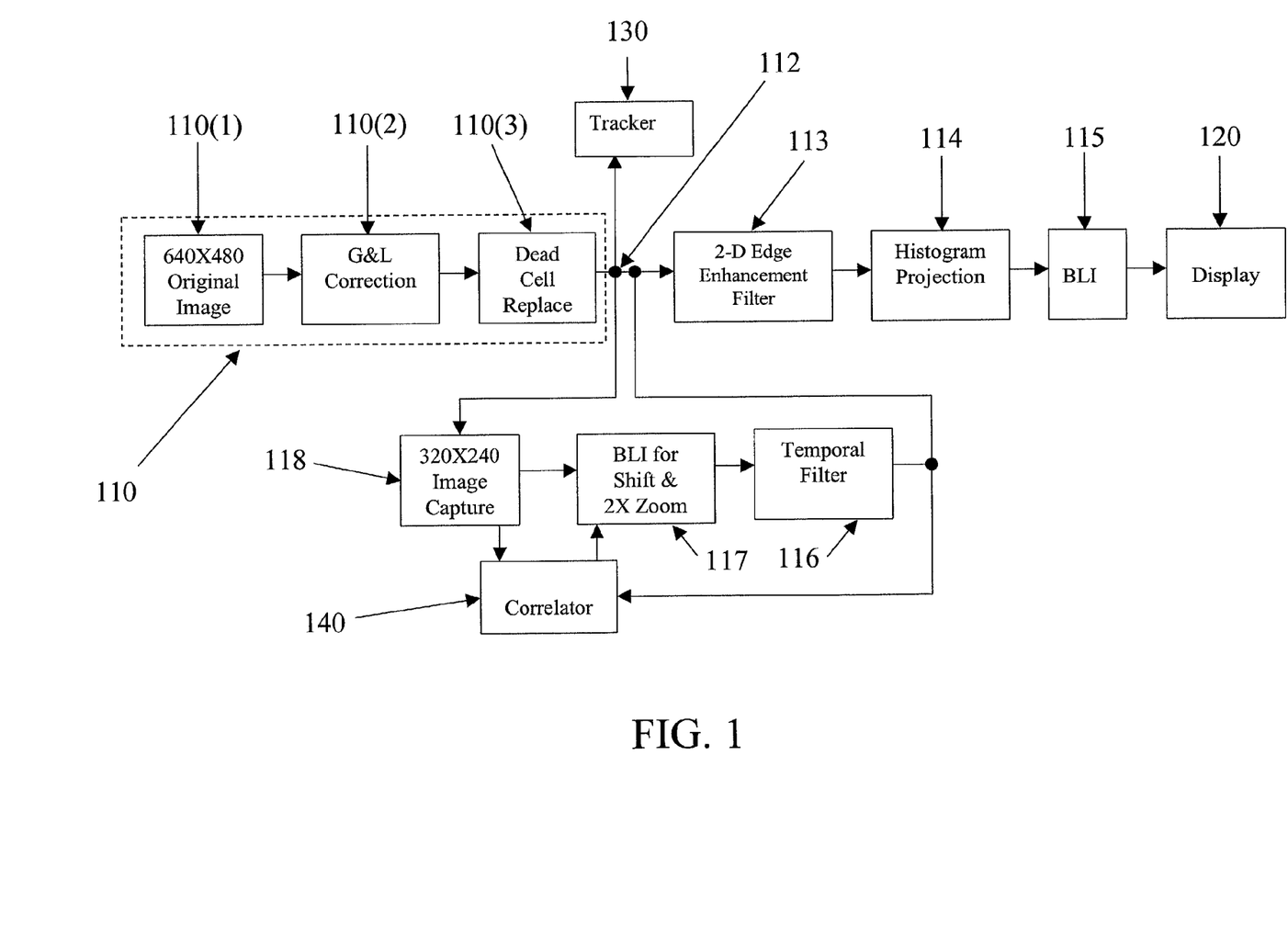
FIG. 1 is a block diagram illustrating a system in accordance with an exemplary embodiment of the present invention.

FIG. 1 is a functional block diagram of a system 100 for processing imagery, such as digital imagery, using an Electro-Optical (EO) system in accordance with an exemplary embodiment of the present invention. Image acquisition can be initiated by an operator or, for example, during target track. Initially, a first frame of data can be selected as a template frame, in any desired fashion. For example, the template frame can be selected from a database of possible templates, or can be captured using the EO system, or any other image source.

In the FIG. 1 embodiment, an image storage device 110 can store an image, referred to herein as an original image 110(1), in any known manner. The original image 110(1) can be a pre-stored frame of image data or image data acquired in any manner known in the art, from any of a variety of EO systems or sensors including, but not limited to, a thermal sensor, imaging radar sensor, infrared sensor or the like, or from, for example, the Field Programmable Gate Array (FPGA) device described in co-pending application entitled "Dynamic Range Compression", Ser. No. 09/841,081, filed even date herewith, the disclosure of which is hereby incorporated by reference in its entirety. The original image 110(1) can be optionally processed with gain and level correction block 110(2) and dead cell replacement block 110(3) to improve the quality of the image. The output of image storage device 110 is an original frame 112. The original frame 112 can be processed in the FIG. 1 example to become the template frame.

More particularly, an image capture device 118 can pass original frame 112 from image storage device 110 through temporal filter 116 or a frame integrator, whereupon the processed image data can become the first frame (e.g., a template frame) for applying an image correlation function at correlator 140 against subsequently-captured frames of data from image capture device 118. However, any technique can be used for generating the template frame. For example, several frames of data (e.g., several original frames 112) could be temporally filtered and then decimated to the original, single frame sample lattice to form the template frame. Alternatively, for example, original frame 112 can become the template frame without any processing (e.g., no temporal filtering).

In addition to receiving original frame 112 from image storage device 110, at least one frame of data of a subsequent image is captured by image capture device 118 (e.g., a camera of an EO system) as a second frame of data, which can be offset from the image frame associated with original frame 112. Image storage device 110 can, of course, also be used to supply the additional frames to image capture device 118. In an exemplary embodiment, a center portion of the second frame, corresponding to a portion (e.g., one-half) of the field-of-view (FOV) of the second frame, is used in subsequent calculations. The second frame can also be optionally processed with gain and level correction and dead cell replacement to improve the quality of the second frame.

A correlator 140 is provided for correlating the second frame with the template frame to generate a shift vector. The shift vector quantifies any shift between the second frame and the template frame. According to an exemplary embodiment of the present invention, correlator 140 is a Mean Absolute Difference (MAD) correlator or any other suitable image correlator. Image correlation stabilizes the second frame and assists in the correction of any line of sight (LOS) deviations between the template frame and the second frame. Thus, correlator 140 insures that the template frame and the second frame are aligned to within a fraction of a pixel, for example, at least $\frac{1}{10}$th of a pixel.

Bilinear interpolator (BLI) 117 can be used to spatially register the second frame with the template frame. Bilinear interpolation is well-known in the art and is described, for example, in U.S. Pat. No. 5,801,678, the disclosure of which is hereby incorporated by reference. BLI 117 interpolates the second frame to shift the second frame relative to the template frame using the shift vector generated by correlator 140 to align the second frame with the template frame. In addition, BLI 117 re-samples (e.g., over-samples) at least a portion of the second frame by a factor of greater than one, or by any desired amount, to generate an output sample lattice. As a result of re-sampling by a factor of two, for example, the output sample lattice will contain at least double the number of samples of the second frame for the portion of the second frame which has been re-sampled. Thus, in an exemplary embodiment, BLI 117 registers a second frame with the template frame by interpolating the second frame using the shift vector, and re-sampling (e.g., over-sampling) at least a portion of the second frame. The second frame can be shifted so that the center of the FOV of the second frame is aligned with the center of the FOV of the template frame.

In an exemplary embodiment of the present invention, bilinear interpolation is used to re-sample and shift the second frame. Those of ordinary skill in the art will appreciate that other forms of interpolation that perform image re-sampling and shifting can also be used, such as cubic interpolation, spline interpolation, or fractal interpolation. As a result of interpolation, image shift due to line-of-sight (LOS) stabilization errors or a small commanded LOS drift can provide over-sampling of a target image in addition to fixed pattern noise averaging over several pixels.

In an alternate exemplary embodiment of the present invention, instead of correlating the template frame with at least a portion of the second frame to generate a shift vector and using the shift vector to shift the second frame, an inertial motion measurement unit (IMU) can be used. An IMU can be used in low SNR conditions where correlation would not be effective. An IMU generates angular measurements. In other words, an IMU measures how much the LOS has changed from one frame to the next. The angular measurement generated by the IMU can be used to shift the second frame. Thus, BLI 117 can interpolate the second frame to shift the second frame relative to the template frame using the angular measurement generated by the IMU to align the second frame with the template frame.

The template frame can also be re-sampled using, for example, bilinear interpolation. As discussed previously, the re-sampled template frame can be derived from the template frame alone, or from any combination of earlier processed frames.

Temporal filter 116 or a frame integrator can be used to combine the re-sampled template frame and the registered frame to generate an averaged frame. According to an exemplary embodiment of the present invention, temporal filter 116 combines the registered frame and the template frame by averaging the two frames together. However, any suitable filtering or integration technique that performs image combination can be used.

Temporal filter 116 or a frame integrator can average each pixel of the template frame with many registered frames to achieve greater than an order of magnitude signal-to-noise ratio (SNR) enhancement within, for example, a few hundred milliseconds. Resulting improvements to the SNR provide a system in accordance with the present invention the capability to significantly enhance the high frequency image data of the averaged frame using a two-dimensional (2-D) edge enhancement filter 113. The averaged frame is also input to correlator 140 as an updated template frame for applying an image correlation function at correlator 140 against subsequently-captured frames of data from image capture device 118. A subsequently-captured frame of data is then registered with the updated template frame using BLI 117.

2-D edge enhancement filter 113 can be used to provide enhancement to the edges contained within the averaged frame. According to an exemplary embodiment, edge enhancement is accomplished by performing a low pass filtering operation on the averaged frame, thereby generating a low pass image. By subtracting the low pass image from the averaged frame, a high pass image is generated. Then, the relative gain of the low and high pass images are adjusted before integrating the two images to form an enhanced image. Two-dimensional edge enhancement is known in the art and is described, for example, in commonly-assigned U.S. Pat. No. 6,359,681, the disclosure of which is hereby incorporated by reference.

Edge enhancement provided by 2-D edge enhancement filter 113 can be suppressed in low contrast conditions to ensure that the image quality is not excessively noisy. Consequently, temporal filter 116 can allow enhancement of high frequency target information, even in lower contrast conditions when 2-D edge enhancement filtering is undesirable. Accordingly, target acquisition is provided closer to the fundamental diffraction limit defined by, for example, the optics associated with sensors and the waveband of operation. The resulting image provided to display 120 can, therefore, be a highly stabilized image with exceptional SNR and resolution performance.

To overcome any eye-to-display limitations, the pixel depth of the image resulting from 2-D edge enhancement filter 113 can be optionally changed with the use of histogram projection 114 before being provided to display 120. Changing the pixel depth of an image using histogram projection is known in the art, and is described, for example, in the above-referenced U.S. Pat. No. 6,359,681. In addition or alternatively to changing the pixel depth of the image, the image resulting from 2-D edge enhancement filter 113 can be optionally interpolated in BLI 115 using, for example, bilinear interpolation to re-sample the image to either reduce or enlarge the size of the image before being provided to display 120.

According to an exemplary embodiment of the present invention, motion is added to the LOS of the EO system according to either a commanded LOS pattern or a random pattern to generate multiple frames of data. The multiple frames are generated by commanding a gimbal to move in either a commanded LOS pattern or a random pattern. This is in contrast to FSM, which moves the gimbal in a very precise manner and which allows for known shifts to align the images. The present invention, however, uses image correlation in correlator 140 to calculate the shift between two or more frames. Therefore, the specific LOS motion need not be known. Rather, the motion simply must be sufficient to ensure that the target image is sampled with different pixels. For example, the movement of the gimbal can be done in a circular or other two-dimensional pattern in order to guarantee that the target image is moved about a sufficient number of different pixels. However, any random motion of the gimbal will suffice. Such motion will allow for the fixed pattern noise to be integrated out.

Once the gimbal has been commanded to move, each of the multiple frames can be analyzed with an image correlation function in correlator 140 and shifted back to the center of the FOV using BLI 117. The shifting will place each of the multiple frames back to the same place as the target image was in the previous frame (i.e., spatially register each of the multiple frames with the template frame). Once this step is complete, each of the registered frames can be passed to temporal filter 116 or frame integrator where each of the registered frames can be averaged with past frames. Temporal averaging will allow for noise integration, which will result in noise reduction. The resulting noise reduction will be observed in both the temporal and spatial domains.

To improve image quality, gain and level correction block 110(2) can be optionally applied to original image 110(1). Gain and level correction can also be optionally applied to the subsequently-captured frames from image capture device 118. Gain and level correction block 110(2) can be used to, for example, remove noise components from original image 110(1) by calibrating each pixel. The noise components to be removed by calibrating each pixel are, for example, caused by variations in the gain and level from one detector element to the next. These gain and level variations are passed to the corresponding pixel values during acquisition of original image 110(1). Calibration is accomplished, in a FLIR for example, by applying a hot reference and a cold reference to each detector element and by adjusting the gain coefficient and the level coefficient for each pixel, if necessary, such that each pixel reflects the same value in response to the hot reference and in response to the cold reference. The process of calibrating each pixel value in response to a hot reference and a cold reference is known in the art, and is described, for example, in the above-incorporated U.S. Pat. No. 6,359,681.

Dead cell replacement is optionally performed at dead cell replacement block 110(2) on original image 110(1). Dead cell replacement can also be optionally applied to the subsequently-captured frames from image capture device 118. This feature can be used to maintain a list of "dead" cells (i.e., detector elements that do not properly respond), and to replace the pixel value corresponding to each "dead" cell with a best approximation value. The best approximation value is derived, for example, by averaging the values of the pixels which border the pixel corresponding to a "dead" cell. Only neighboring pixels that correspond to properly functioning detector elements are used for deriving a best approximation value.

Dead cell replacement block 110(2) can determine which detector elements are "dead" by applying any number of well known criteria. For example, the thermal response of each detector element can be compared to an expected response. If the actual response is far greater or far less than expected, the corresponding detector element is probably not functioning properly. Another criterion that is often used to establish whether a detector element is not properly functioning is whether the digital response of the detector element is steady or whether it appears to flicker. A flickering or jittery response probably indicates that the corresponding detector element is not properly functioning. Yet another criterion is to compare the actual response of a given detector element to the mean value taken from the response of all of the detector elements. A response that is substantially different from the mean response probably indicates that the corresponding detector element is not functioning properly. Also, if the dynamic range of a given detector element is limited, this probably indicates that the detector element is not functioning properly. One skilled in the art will understand that this list of criteria is not exclusive, and that other criteria can similarly be used to identify "dead" detector elements. The procedure for replacing "dead" cells is known in the art, and is described, for example, in the above-incorporated U.S. Pat. No. 6,359,681.

One skilled in the art will understand that other techniques can be used for improving image quality, such as the technique described in co-pending application entitled "Scene-Based. Non-Uniformity Correction for Detector Arrays", Ser. No. 09/840,920, filed even date herewith, the disclosure of which is hereby incorporated by reference in its entirety.

Figure 2:
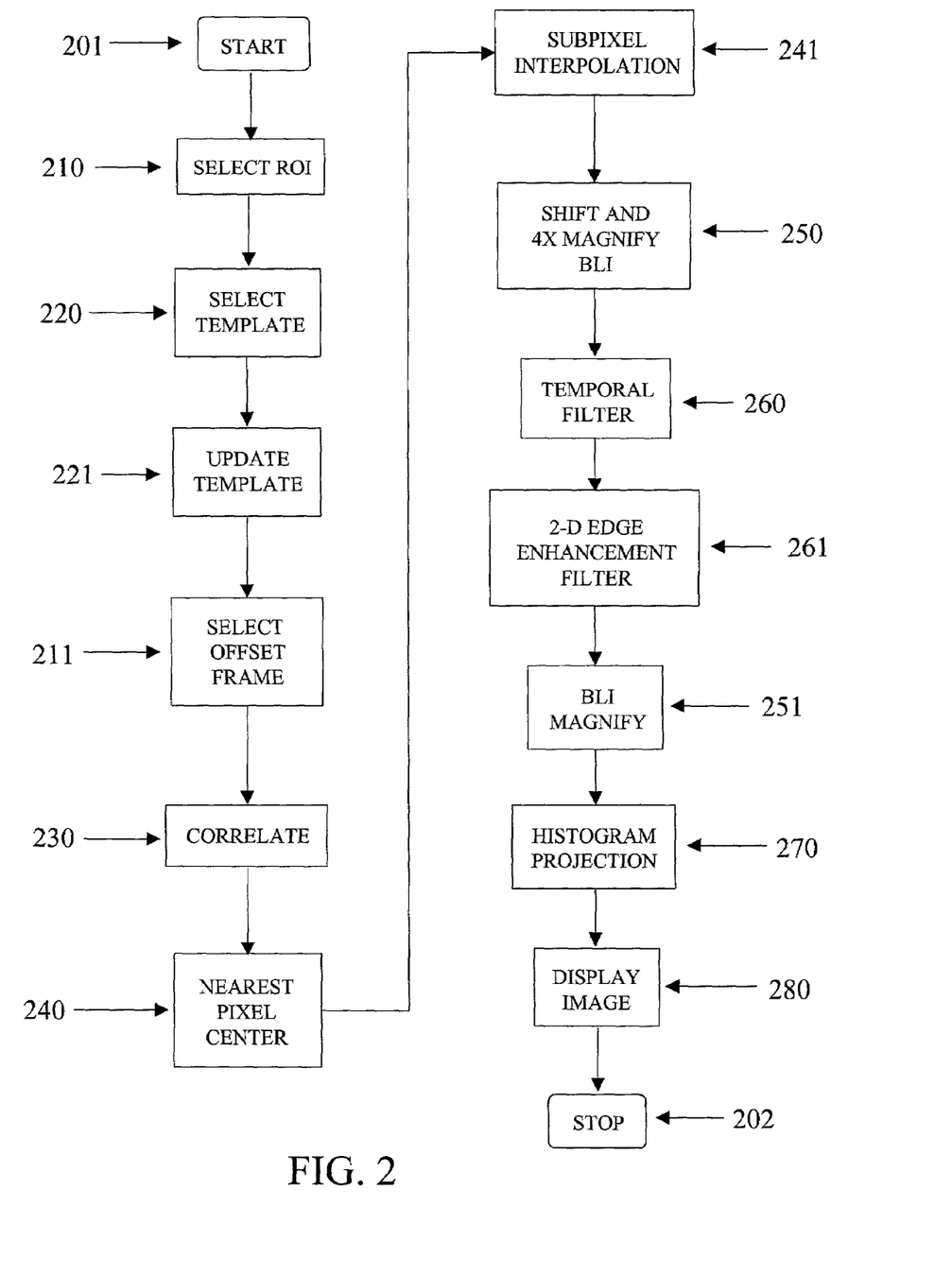
FIG. 2 is a flowchart illustrating steps in accordance with an exemplary embodiment of the present invention.

The FIG. 2 flowchart shows exemplary process steps in accordance with the present invention. An exemplary extended range image processing scenario 200 is illustrated beginning from step 201. Accordingly, at step 210, a region of interest (ROI) is selected around a target in the image data provided from a typical sensor or other EO system. The ROI can be, for example, 160×120 pixels such that when re-sampling occurs, the resulting image will be on the order of, for example, 640×480 pixels, which is the size of the input image and represents an over-sampling of four times.

A template frame can be selected and stored in step 220. For example, the original frame 112 acquired by the EO system can be temporally filtered to generate the template frame. The template can be used to initiate the functionality as is described herein and is, for example, 32×32 pixels in size to provide sub-Patent pixel target centroids. The template can further be stored, for example, in full 16-bit palette representation. The template can be updated in step 221, whenever it is desirable to do so.

Updating the template can be performed from the down-sampled output of a temporal averaging filter such as that used, for example, in step 260. Updating can occur, for example, every four frames, since continuous updating can result in a filtered template that can be blurred and shifted.

A second frame of data can then be selected in step 211 from the center of the ROI. The second frame can be, for example, the same size as the template plus a border to ensure full enclosure of the target. The size of the border region can be selected based on the amount of "walking" that will occur from one frame to the next such that the centroid can be accurately determined.

In step 230, image correlation is performed on the template frame and the second frame. The image correlator is preferably a Mean Absolute Difference (MAD) correlator that subtracts the template frame from the second frame in a point-wise fashion. The magnitude of the result is then averaged for each valid point of the target that is totally enclosed in the respective frames. The results of correlation in step 230 will be, for example, a correlator output matrix with a size equal to the size difference between the first and template frames plus one.

The correlator output matrix can then be analyzed in step 240 to determine the center of the target in the second frame. The correlator output matrix includes a set of numbers indicating how similar the template frame and the second frame are at each point. The pixel value in the correlator output matrix having the smallest number associated with it represents the center point of the second frame that is most similar to the template frame. To better find the true center pixel, the most-likely center pixel can first be determined by using measures of the correlation value and the distance from the anticipated center.

Once the center pixel is determined using, for example, the process described in relation to step 240, sub-pixel interpolation can be performed in step 241. Sub-pixel interpolation involves, for example, analyzing a 5×5 pixel region around the center pixel to determine the true centroid with a high degree of accuracy. Accordingly, a fourth-order polynomial can be generated to fit the x and y means and a minimum value determined for the polynomial fit. The minimum value of the polynomial fit represents the true centroid in the second frame to within, for example, ¹⁄₂₀th of a pixel. A shift vector can be generated from the minimum fit value, which can be used in the BLI of step 250 to shift the second frame.

As described, the shift vector can be used in block 250 to shift the second frame to align it with the template frame. The second frame is then re-Patent sampled (e.g., over-sampled) by, for example, a factor of four. The resulting shifted and re-sampled second frame will be spatially registered with the template frame. The shifting and magnification are performed, for example, by means of bilinear interpolation. However, those of ordinary skill in the art will appreciate that other forms of interpolation that are capable of shifting and re-sampling an image can be used, such as cubic interpolation, spline interpolation, or fractal interpolation. The output of the BLI in step 250 (i.e., the registered frame) will have invalid regions that can be set to zero.

After interpolation in step 250, the registered frame and a likewise re-sampled template frame can be filtered with a temporal-averaging filter in step 260 to generate an averaged frame. It should be noted that a temporal recursive frame filter can be used, but only if correlation metrics indicate that a suitable centroid was determined in, for example, steps 240 and 241. By using, for example, a temporal recursive frame filter with tapered coefficients equal to 1-(1/number of recursive iterations), a faster response can be achieved from the filter with greater noise reduction. Zeros at the edges of the FOV should not be updated.

At step 261, high spatial frequency components of the averaged frame can be enhanced using a multi-stage 2-D edge enhancement filter. For example, the averaged frame can be blurred with an n×n box filter, multiplied by a constant less than one and subtracted from the original averaged frame. Multiple stages are applied in series, for example, so that different weights can be used for different spatial frequency levels. Expected frequency levels are, for example, 7×7, 5×5, and 3×3. Larger kernel sizes are used, because of the magnification factors.

Down-sampling can be performed by BLI magnification in step 251 when the image resulting from the 2-D edge enhancement filter of step 261 needs to be set to the appropriate size for display. The image can be down-sampled by simply windowing down on an ROI around the target, or by applying BLI magnification of less than the current image magnification. The image can be further manipulated by, for example, down-converting the image from 16-bit palette to an 8-bit palette using histogram projection in step 270. The down-sampled and/or down-converted image can be displayed to the operator in step 280. Finally, at step 202, scenario 200 can be stopped or continued in a cyclical fashion to process subsequently-captured frames of data.

The exemplary process steps of FIGS. 1 and 2 in accordance with the present invention can be implemented using a sensor (not shown) for generating input data. The sensor can be, for example, a CCD camera, FLIR, a vidicon camera, a Low Light Level camera, a laser illuminated camera, or any other EO sensor capable of collecting image data. A person skilled in the art will realize that the operations of the exemplary process steps of FIGS. 1 and 2 can be controlled by a processor module (not shown), coupled to the sensor, that uses a suitable software program. In an exemplary embodiment of the present invention, the processor module can be configured to select a first frame of data as a template frame, capture a second frame of data using the EO system, correlate at least a portion of the second frame with the template frame to generate a shift vector, register the second frame with the template frame by interpolating the second frame using the shift vector and re-sampling at least a portion of the second frame to produce a registered frame, re-sample the template frame, and combine the re-sampled template frame and the registered frame to generate an averaged frame The processor module can be implemented with a general purpose microprocessor (e.g., a general purpose microprocessor from Intel, Motorola, or AMD). In an alternate exemplary embodiment, the processor module can be implemented using a FPGA, such as, for example, a Virtex Series FPGA from Xilinx that can have from, for example, one million to three million gates per FPGA.

Figure 3A:
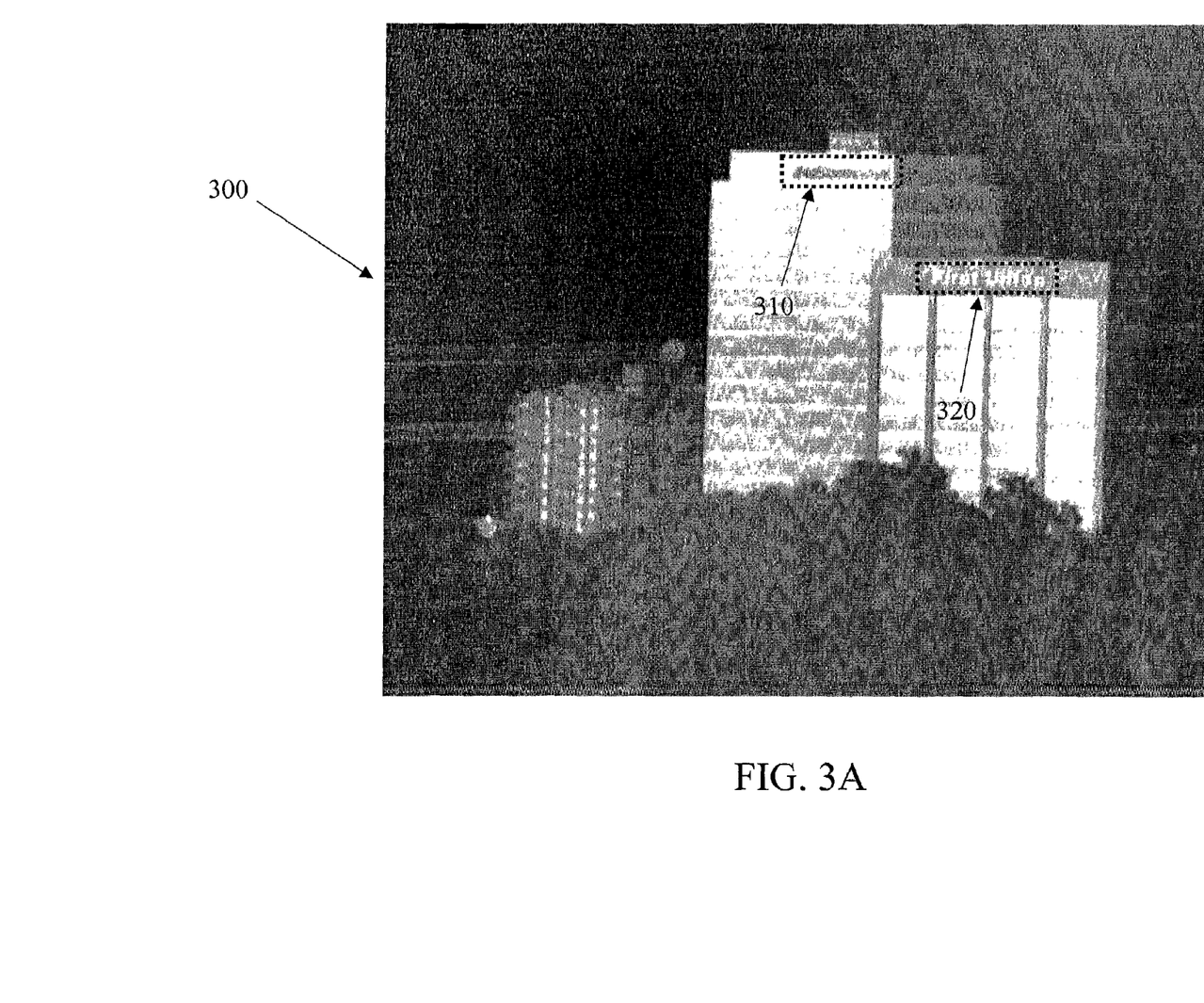
FIG. 3A is an exemplary image of a scene produced without extended range image processing of the present invention.
Figure 3B:
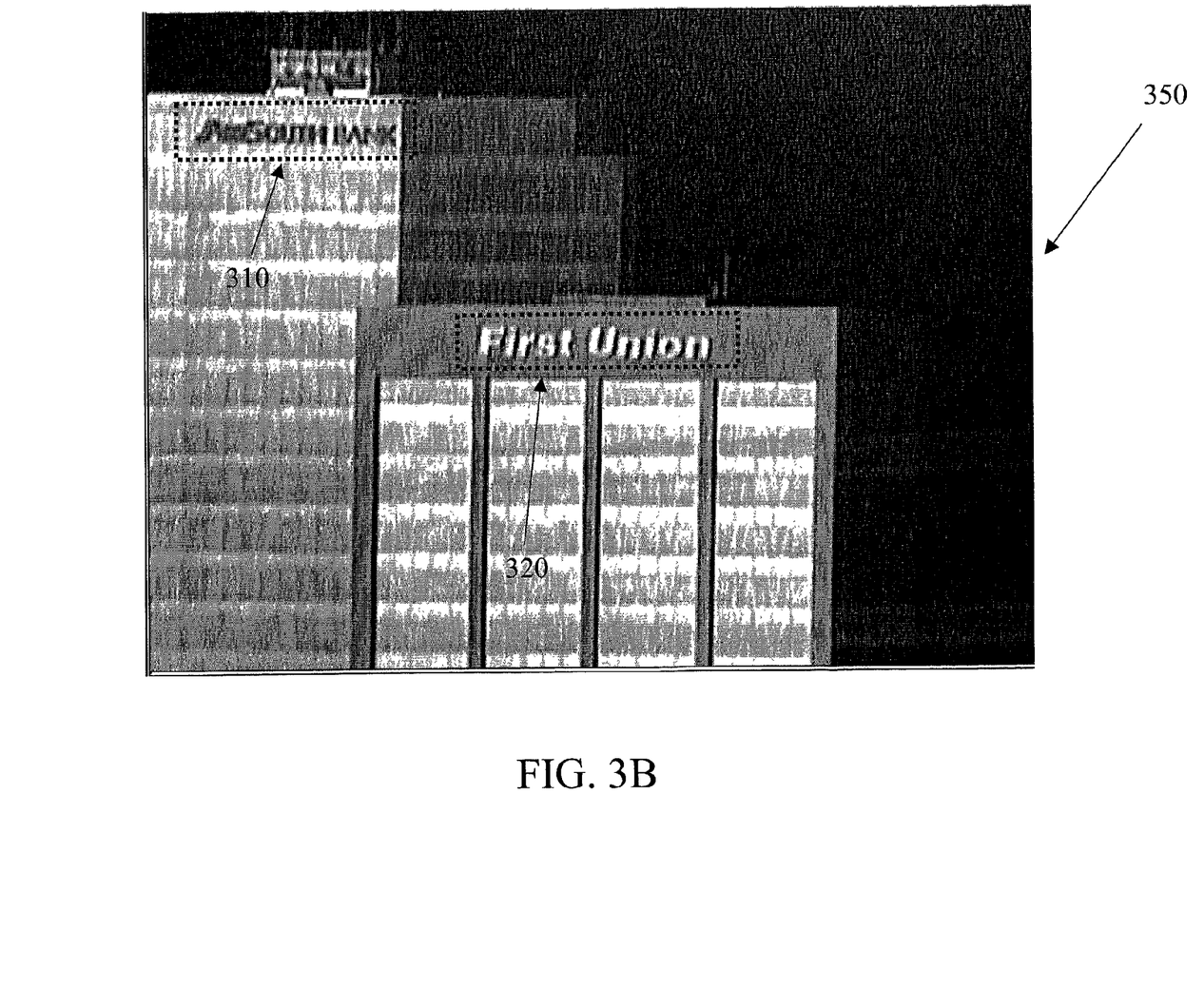
FIG. 3B is an image of the same scene with extended range image processing in accordance with an exemplary embodiment of the present invention.

An example of a scene image generated in accordance with the present invention is shown in FIG. 3B. When applying extended range image processing in accordance with the present invention on, for example, scene image 300 depicted in FIG. 3A, which is an example of low contrast mid-wavelength infrared (MWIR) staring imagery, scene image 350 of FIG. 3B results. It should be noted that scene image 300 was captured during nighttime conditions in downtown Orlando from a range in excess of 13 km. It should further be noted that the still bitmap associated with scene image 350 does not demonstrate that original scene image 300 depicted in FIG. 3A is moving due to, for example, stabilization errors and gimbal drift, while scene image 350, processed using extended range image processing in accordance with the present invention, remains stationary.

A comparison of scene image 300 and scene image 350 does demonstrate the significant increase in image quality based, for example, on the clarity of features 310 and 320 from scene image 300 to scene image 350. Performance enhancement associated with extended range image processing can vary depending on conditions. For example, scene image 300 was generated in low contrast conditions at night. In high contrast daytime conditions, SNR performance can be considerably higher using extended range image processing in accordance with the present invention and the application of greater 2-D edge enhancement can be possible. In these high contrast conditions, atmospheric scintillation will likely be the ultimate limit to performance.

It should be noted that correlator 140 shown in FIG. 1 can be limited in removing relative target motion which occurs during the integration time of the detector. However, because typical conventional systems use an isolated gimbal and because integration time is relatively short, any target motion occurring during the detector integration time is expected to be insignificant. Accordingly, RMS stabilization error will be, therefore, less than ⅒th of the pixel for all sources including correlation error, stabilization error occurring during detector integration, and interpolation error associated with the BLI.

As previously noted, EO sensor performance can often be limited in resolution by stabilization performance in high contrast conditions. Sensitivity, as can be represented, for example, by a SNR measure, also can limit performance in low contrast conditions. Thus, extended range image processing in accordance with the present invention can overcome limitations associated with conventional systems and significantly increase the effective performance range of an associated EO system. Additional effective range capabilities provide higher probability of target/object recognition and identification which can, for example, enhance the battlefield survivability of a military aircraft equipped with a system in accordance with the present invention, and reduce the risk of casualties due to friendly fire. Additional range provided in accordance with the present invention can also provide an increased margin of recognition and identification in poorer atmospheric conditions.

Figure 4:
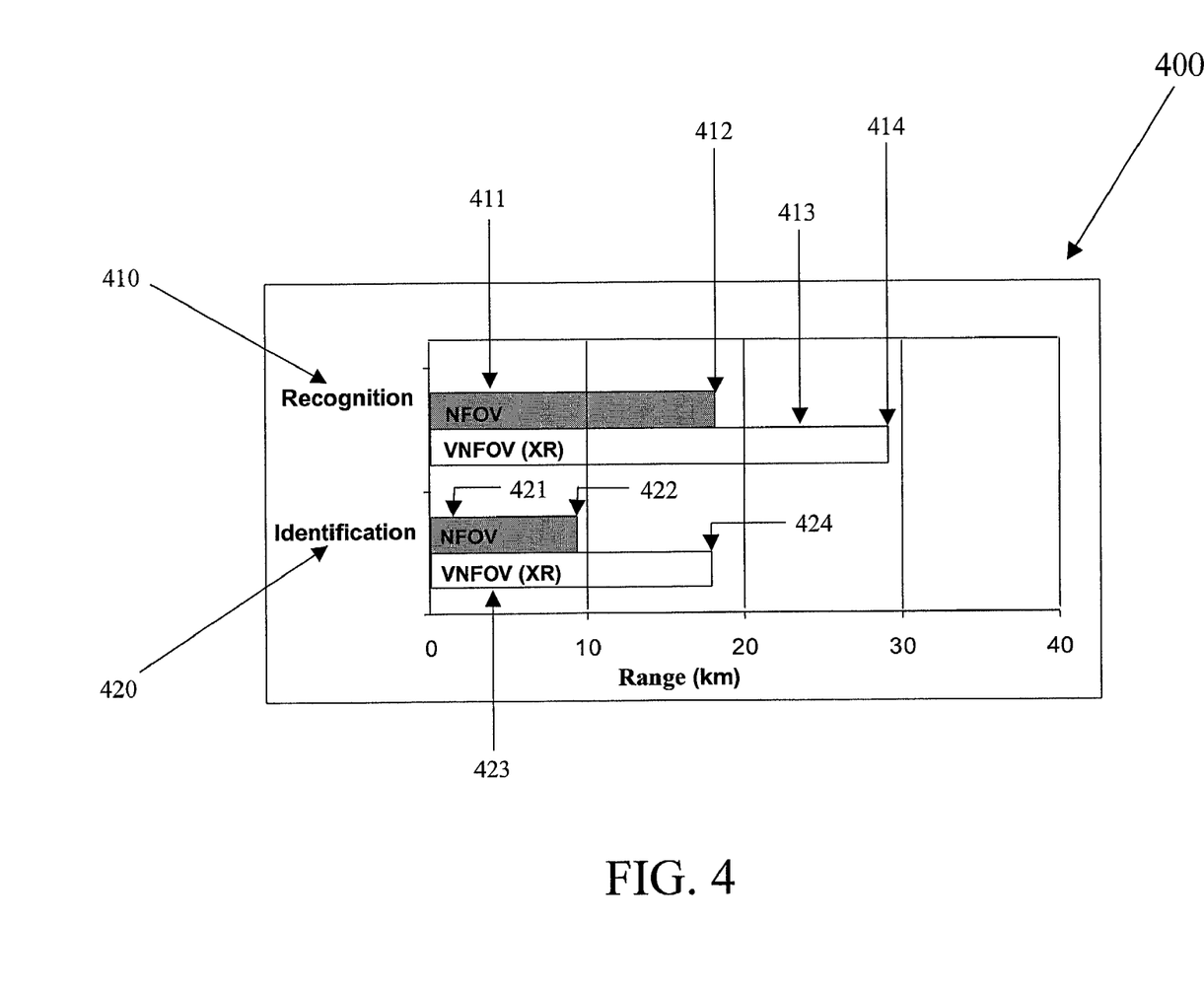
FIG. 4 is a diagram illustrating exemplary range comparisons between conventional Narrow Field of View (NFOV) versus Very Narrow Field of View (VNFOV) in accordance with an exemplary embodiment of the present invention.

The advantages associated with a system in accordance with the present invention are illustrated in graph 400 shown in FIG. 4. Therein, recognition bar graph 410 and identification bar graph 420 show an example of the comparative benefits of the extended range image processing in accordance with the present invention in a standard 23 km visibility atmosphere. For recognition related processing, the range of conventional Narrow Field-Of-View (NFOV) 411 sensing has recognition limit 412 at around 18 km, while extended range image processing in accordance with the present invention yields Very Narrow Field-Of-View (VNFOV) 413 for the same sensing elements with recognition limit 414 at close to 30 km. For identification related processing, the range of conventional Narrow Field-Of-View (NFOV) 421 sensing has identification limit 422 at around 9 km, while extended range image processing in accordance with the present invention yields Very Narrow Field-Of-View (VNFOV) 423 for the same sensing elements with identification limit 424 at close to 18 km. It can be seen from the graphs in FIG. 4 that extended range image processing in accordance with the present invention can increase recognition range about 1.75 times and identification by about two times the basic EO system performance.

It should be noted that performance graphs illustrated in FIG. 4 are based on empirical results using, for example, a 2.86×2.86 meter target, 2 degree thermal contrast, and 23 km visibility atmosphere. It should further be noted that baseline sensor, recognition, and identification ranges were performed in NFOV mode while the extended range image processing use VNFOV. VNFOV mode is preferably not implemented without extended range image processing in accordance with the present invention, because VNFOV generally operates at an f-stop of F/6.9. The loss of NET associated with F/6.9 would generally produce a relatively noisy picture in moderate to low contrast situations. The improvement of NET due to temporal integration associated with extended range image processing in accordance with the present invention enables use of the VNFOV while still providing excellent SNR performance. In accordance with various embodiments of the present invention as described herein, the extended range image processing can be integrated into, for example, present platforms without radical modification. Accordingly, modifications to, for example, computer software can be minimized or eliminated along with the need for additional operator training.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for processing imagery using an Electro-Optical (EO) system, comprising the steps of:
    selecting a first frame of data as a template frame;
    capturing a second frame of data using the EO system;
    correlating at least a portion of the second frame with the template frame to generate a shift vector;
    registering the second frame with the template frame by interpolating the second frame using the shift vector and re-sampling by spatially oversampling at least a portion of the second frame by a factor greater than one to produce a registered frame;
    re-sampling the template frame;
    combining the re-sampled template frame and the registered frame to generate an averaged frame; and
    selecting the averaged frame as an updated template frame to which a subsequently captured frame of data is registered, wherein the first and second frames are obtained from a stationary infrared imagery.

2. The method of claim 1, wherein the step of registering the second frame uses bilinear interpolation.

3. The method of claim 1, comprising the step of:
    adding motion to a line of sight of the EO system using a commanded line of sight pattern or a random pattern to generate multiple frames of data.

4. The method of claim 1, comprising the step of:
    spatially filtering the averaged frame to enhance edges within the averaged frame.

5. The method of claim 1, comprising the step of:
    utilizing a histogram projection to change a pixel depth of the averaged frame.

6. The method of claim 1, comprising the step of:
    re-sampling the averaged frame.

7. The method of claim 6, wherein the step of re-sampling the averaged frame uses bilinear interpolation.

8. The method of claim 1, comprising the steps of:
    capturing a first frame of data using the EO system; and
    temporally filtering at least the first frame to generate the template frame.

9. The method of claim 8, wherein the step of re-sampling the template frame uses bilinear interpolation.

10. The method of claim 1, comprising successively selecting further frames of data at intervals of a predetermined number of frames to be updated template frames.

11. An Electro-Optical (EO) system for processing imagery, comprising:
    a sensor for generating input data; and
    a processor module coupled to the sensor, the processor module configured to:
    select a first frame of data as a template frame;
    capture a second frame of data using the EO system;
    correlate at least a portion of the second frame with the template frame to generate a shift vector;
    register the second frame with the template frame by interpolating the second frame using the shift vector and re-sampling by spatially oversampling at least a portion of the second frame by a factor greater than one to produce a registered frame;
    re-sample the template frame;
    combine the re-sampled template frame and the registered frame to generate an averaged frame; and
    select the averaged frame as an updated template frame to which a subsequently captured frame of data is registered, wherein the first and second frames are obtained from a stationary infrared imagery.

12. The EO system of claim 11, wherein the processor module, in registering the second frame, is configured to use bilinear interpolation.

13. The EO system of claim 11, wherein the processor module is configured to:
    add motion to a line of sight of the EO system using a commanded line of sight pattern or a random pattern to generate multiple frames of data.

14. The EO system of claim 11, wherein the processor module is configured to:
    spatially filter the averaged frame to enhance edges within the averaged frame.

15. The EO system of claim 11, wherein the processor module is configured to:
    utilize a histogram projection to change a pixel depth of the averaged frame.

16. The EO system of claim 11, wherein the processor module is configured to:
    re-sample the averaged frame.

17. The EO system of claim 16, wherein the processor module, in re-sampling the averaged frame, is configured to use bilinear interpolation.

18. The EO system of claim 11, wherein the processor module is configured to:

capture a first frame of data using the EO system; and temporally filter at least the first frame to generate the template frame.

19. The EO system of claim 18, wherein the processor module, in re-sampling the template frame, is further configured to use bilinear interpolation.

20. The apparatus of claim 11, wherein the processor module is configured to successively select further frames of data at intervals of a predetermined number of frames to be updated template frames.

* * * * *